under tension are shown anchored at their ends to the other ends of the centrifugal weight levers 21 by pins 25, and to the projections 9 by pins 26. The centrifugal weight levers 21, are also provided with holes 27 for carrying balls 28, which protrude therefrom. A pair of

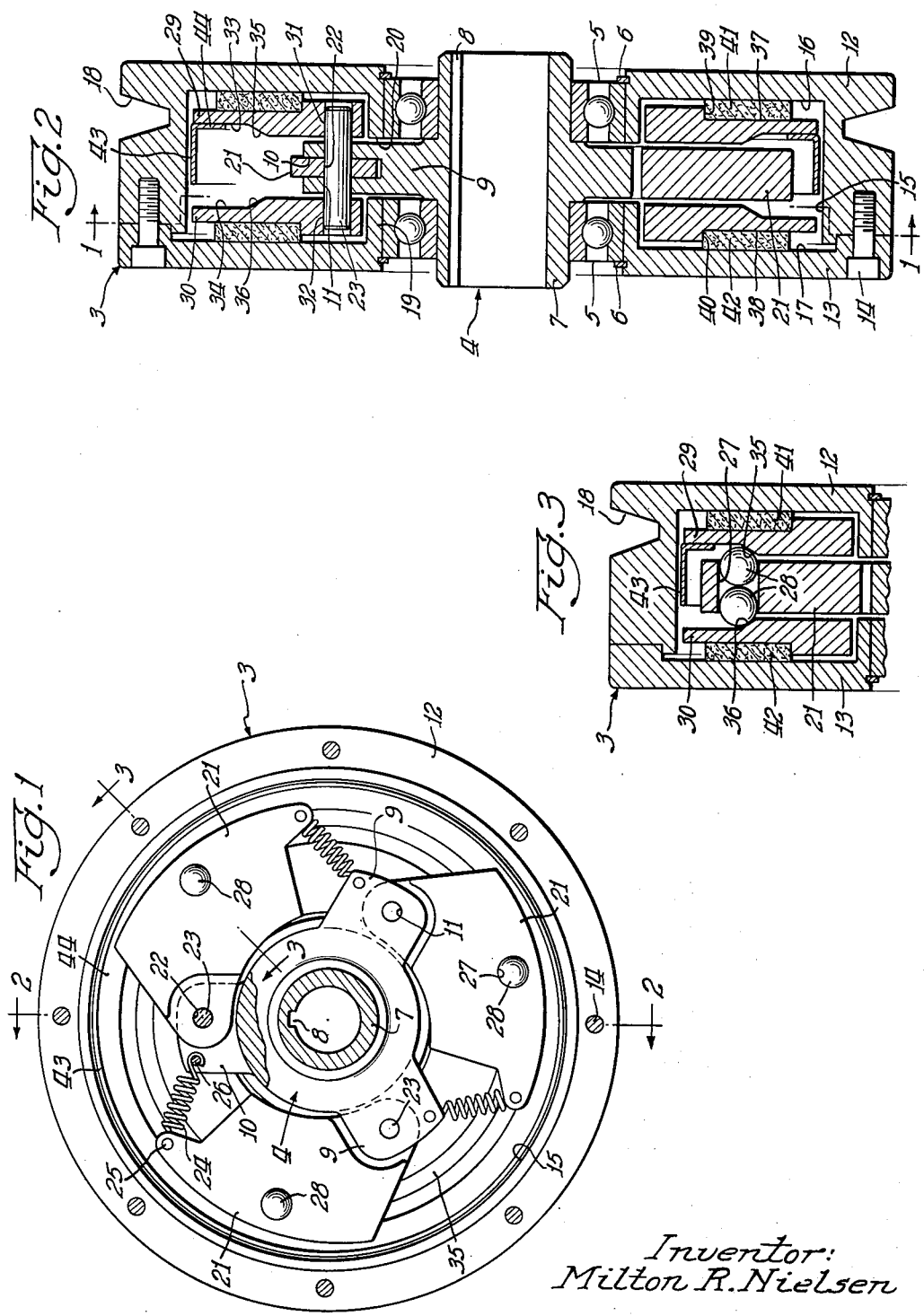

United States Patent Office 3,058,560
Patented Oct. 16, 1962

3,058,560
CONSTANT SPEED DRIVE
Milton R. Nielsen, Wooster, Ohio, assignor to Borg-Warner Corporation, Chicago, Ill., a corporation of Illinois
Filed June 9, 1958, Ser. No. 740,706
3 Claims. (Cl. 192—104)

This invention relates to a constant speed drive mechanism of the centrifugally disengaging type for maintaining the output speed at a substantially predetermined level.

An important object of the invention is to provide a constant speed drive mechanism which is simple in construction, low in manufacturing costs and comprises an enclosed housing which contains the speed regulating means bathed in oil to reduce friction.

It is a more particular object to provide a constant speed drive mechanism comprising a driven member rotatably mounted on bearings at the inner periphery of a driving member and controlled friction means between the driven and driving members for maintaining a predetermined constant output speed of the driven member.

The invention consists of the novel constructions, arrangements and devices to be hereinafter described and claimed, to carry out the above stated objects and such other objects as will appear from the following description of a preferred form of the invention, illustrated with reference to the accompanying drawings wherein:

FIG. 1 is a sectional side view of a constant speed drive mechanism embodying the invention and taken on line 1—1 of FIG. 2;

FIG. 2 is a sectional view taken on line 2—2 of FIG. 1; and

FIG. 3 is a sectional view taken on line 3—3 of FIG. 1.

Like characters of references designate like parts in the several views.

Referring now to the drawings, the illustrated drive mechanism comprises driving and driven members 3 and 4 respectively, rotatable with respect to each other on bearings 5. Retaining rings 6 mounted in annular grooves in the inner periphery of the driving member 3 and extending inwardly beyond the outer faces of the bearings 5 are provided to keep members 3 and 4 in their relative positions. The driven member 4 comprises a hub 7 on which the bearings 5 are mounted and which is provided with a keyway 8 to which an output shaft for operating any suitable mechanism may be keyed. The hub 7 has radially extending projections 9 which have slots 10 and laterally extending holes 11 therethrough as shown.

The driving member 3 comprises a pair of annular separable parts 12 and 13 secured together by bolts 14, thereby forming a quadrangular annular housing having a quadrangular annular cavity 15. The cavity 15 is defined by inner side faces 16 and 17 of the parts 12 and 13. An annular V groove 18 is provided in the outer periphery of the separable part 12 for receiving a belt for operably driving the driving member 3. The driving member 3 has inner peripheral walls 19, by which it is mounted on the bearings 5. The walls 19 have an annular opening 20 therebetween for receiving the projections 9.

Within the cavity 15, centrifugal weight levers 21 are provided with holes 22 at one end whereby they are pivotally held in the slots 10 by means of pivots 23 which pass through and protrude beyond the holes 11.

Referring now to FIGURE 1, which gives a more detailed view of the centrifugal weight levers 21; springs 24, under tension are shown anchored at their ends to the other ends of the centrifugal weight levers 21 by pins 25, and to the projections 9 by pins 26. The centrifugal weight levers 21, are also provided with holes 27 for carrying balls 28, which protrude therefrom. A pair of clutch plates 29 and 30 are provided which have holes 31 and 32 respectively, by means of which they are slidably mounted on the protruding portions of the pivots 23 on each side of the projections 9. The clutch plates 29 and 30 have inner faces 33 and 34, respectively, which are provided with annular ramps 35 and 36, respectively, which coact with balls 28, so as to cause the clutch plates 29 and 30 to be in static frictional engagement with a pair of clutch discs 41 and 42 due to the outwardly lateral movement of the clutch plates 29 and 30 when the balls 28 roll inwardly on the ramps 35 and 36 as the springs 24 cause the centrifugal weight levers 21 to swing inwardly on the pivots 23. The clutch plates 29 and 30 also have outer faces 37 and 38, respectively, which are provided with flanges 39 and 40, respectively, at their inner peripheries.

The pair of clutch discs 41 and 42 are slidably carried on the flanges 39 and 40, respectively. Clutch disc 41 coacts frictionally with faces 16 and 37 and clutch disc 42, coacts frictionally with faces 17 and 38. The faces 16, 17, 37 and 38 may be described as clutch facings.

A limit ring 43, having an inwardly extending flange 44 is provided to restrict the outward movement of the centrifugal weight levers 21. It is a floating member and the flange 44 serves as a means to retain the limit ring 43, within certain lateral confines.

This invention may be described as a clutch means which, in its static condition, is in engagement and remains so when in operation until a certain predetermined speed is reached, at which time the movement of centrifugal weights causes reduction of pressure between the clutch discs and clutch facings, whereby slippage occurs and the output speed is maintained substantially at that level, regardless of the input speed.

More specifically, when in operation, the driving member 3 is being rotated or driven by a belt mounted in the annular groove 18. As long as the rotating speed of the driving member 3 is below the predetermined speed, the driven member 4 rotates at the same speed because the clutch discs 41 and 42 are in frictional engagement with the faces 16 and 17, and 37 and 38, respectively, thereby effecting a frictional coupling between the driving member 3 and the driven member 4. When the speed of the driving member 3 exceeds the predetermined speed at which the driven member 4 is to operate, the centrifugal weight levers 21, under the influence of centrifugal force move outwardly against the tension springs 24, thereby causing the balls 28 to move downwardly on the ramps 35 and 36 causing reduction of pressure against the clutch discs 41 and 42 which lie between the faces 16 and 37 and the faces 17 and 38 respectively, which results in slippage between the surfaces of the clutch plates and their respective engaging faces and thereby limits the magnitude of torque which can be transmitted to the driven member 4 and hence maintains the driven member 4 at a constant speed.

As already mentioned, the driving and driven members 3 and 4 are rotatable with respect to each other on bearings 5. However, these members are fixed with respect to each other when in a static condition because of frictional engagement between the two members by virtue of a pair of clutch discs 41 and 42. It is only when in operation and the centrifugal force on the centrifugal weight levers 21 reduces the pressure with respect to the clutch discs 41 and 42, that relative movement between the driving and driven members 3 and 4 occurs, and this is so because the reduced pressure, when adequate, results in slippage between the clutch discs 41 and 42 and their respective clutch facings, thereby causing relative movement between the two members 3 and 4.

More specifically, the hub 7 has projections 9 which extend into the cavity 15 of the driving members 3 and carry the centrifugal weight levers 21 and the clutch plates 29 and 30. Hence these elements are all a part of the driven member 4 and have no contact with the driving member 3 except through the clutch discs 41 and 42 which are engageable with the faces 16 and 17 of the driving member 3, and the clutch plates 29 and 30 of the member 4. When the clutch discs 41 and 42 are not frictionally locked between the driving and driven members 3 and 4 respectively, they are independently rotatable with respect to each other on bearings 5.

The cavity 15, preferably, is provided with oil so that the various surfaces which are frictionally engaged are lubricated to prevent excessive wear during the periods of slippage in the maintenance of a constant speed when in operation.

It should be noted that the predetermined speed is dependent on the relationship between the weight and length of the centrifugal weight levers 21 and the resistance of the springs 24.

The limit ring 43 is provided to limit the outward movement of the centrifugal weight levers 21, so that they may not contact the outer peripheral wall of the cavity 15 under the influence of centrifugal force and thereby insures a smoother operating mechanism.

I wish it to be understood that my invention is not to be limited to the specific constructions and arrangements shown and described, except only insofar as the claims may be so limited, as it will be understood to those skilled in the art that changes may be made without departing from the principles of the invention.

I claim:

1. In a centrifugal disengaging mechanism, a driving member comprising a pair of annular members having inner sidewalls and fastened together to form a cavity therebetween with an annular opening in its inner periphery, a driven member rotatably mounted at the inner periphery of said driving member, said driven member comprising a hub with radially extending projections which extend through said annular opening into said cavity, each of said radially extending projections formed with a slotted end portion, centrifugal weight levers formed with holes therethrough and having an inner end portion, pivotally held in said slotted end portions by pins extending through said inner end portions and said slotted end portions, clutch plates having inner and outer faces, each of said clutch plates carried on opposite sides of said pins, clutch discs between said clutch plates and said sidewalls, a pair of balls carried by each of said centrifugal weight levers in said holes, each ball of a pair being in axial alignment with respect to the axis of rotation of said driving member, annular ramps on the inner faces of said clutch plates said balls being positioned at the inner periphery of said ramps, and springs under tension connected between said projections and said centrifugal weight levers.

2. In a centrifugal disengaging mechanism, a driving member comprising a pair of annular members having inner sidewalls and fastened together to form a cavity therebetween with an annular opening at its inner periphery, a driven member rotatably mounted at the inner periphery of said driving member, said driven member comprising a hub with radially extending projections which extend through said annular opening into said cavity, each of said radially extending projections formed with a slotted end portion centrifugal weight levers formed with holes therethrough and having an inner end portion, pivotally held in said slotted end portions by pins extending through said inner end portions and said slotted end portions, clutch plates having inner and outer faces, each of said clutch plates carried on opposite ends of said pins, clutch discs between said clutch plates and said sidewalls carried by said clutch plates, a pair of balls carried by each of said centrifugal weight levers in said holes, each ball of a pair being in axial alignment with respect to the axis of rotation of said driving member, annular ramps on the inner faces of said clutch plates being positioned at the inner periphery of said ramps, said balls being positioned at the inner periphery of said ramps, and springs under tension connected between said centrifugal weight levers and said projections adjacent thereto.

3. In a centrifugal disengaging mechanism, a driving member comprising a pair of annular members having inner side walls and fastened together to form a housing defining a cavity therebetween, the said housing having an annular opening at its inner periphery, a driven member rotatably mounted at the inner periphery of said driving member, said driven member comprising a hub with radially extending projections which extend through said annular opening into said cavity, each of said radially extending projections formed with a slotted end portion, centrifugal weight levers formed with holes laterally therethrough and having an inner end portion pivotally held in said slotted end portions by pins extending laterally through said inner end portions and said slotted end portions, a pair of clutch plates having inner and outer faces each of said clutch plates carried on opposite ends of said pins, clutch discs between said pair of clutch plates and said side walls, a pair of balls carried by each of said centrifugal weight levers in said holes, annular ramps on the inner faces of said pair of clutch plates one of each of said pairs of balls carried by each of said centrifugal weight levers being positioned at the inner periphery of one of said ramps on one of said clutch plates, and the other balls of said pairs of balls being positioned at the inner periphery of the said ramp on the said other of said clutch plates, springs under tension connected between said pair of projections and said centrifugal weight levers, and a floating ring disposed within said housing in close proximity to the inner face of the outer periphery of said housing in surrounding relationship to said centrifugal weight levers to thereby restrain said centrifugal weight levers from engagement with the said inner face of the said outer periphery of the said housing.

References Cited in the file of this patent

UNITED STATES PATENTS

| | | |
|---|---|---|
| 724,765 | White et al. | Apr. 7, 1903 |
| 1,357,403 | Kimble | Nov. 2, 1920 |
| 2,254,592 | Berkeley | Sept. 2, 1941 |
| 2,263,702 | Kreis | Nov. 25, 1941 |
| 2,432,591 | Schuckers | Dec. 16, 1947 |
| 2,463,100 | Gredell | Mar. 1, 1949 |
| 2,678,119 | Birbaum | May 11, 1954 |
| 2,697,501 | Kreis | Dec. 21, 1954 |
| 2,755,902 | Kreis | July 24, 1956 |
| 2,837,193 | Wilder | June 3, 1958 |